United States Patent Office 3,432,179
Patented Mar. 11, 1969

3,432,179
TOE IRON FOR SAFETY SKI-BINDINGS
Hannes Marker, Hauptstrasse 51–53, Garmisch-Partenkirchen, Germany, and Günter Adam, Garmisch-Partenkirchen, Germany; said Adam assignor to said Marker
Filed June 1, 1966, Ser. No. 554,549
Claims priority, application Germany, June 3, 1965, M 65,460
U.S. Cl. 280—11.35
Int. Cl. A63c 9/00
8 Claims

ABSTRACT OF THE DISCLOSURE

Toe irons for safety ski bindings of the type which can be swivelled out of their normal position to either side of the ski. The swivel action takes place about a vertical axis lying in the area of the heel of the ski boot without forwardly directed components of motion in the longitudinal direction of the ski. Beyond a predetermined angular pivoting, release occurs. The toe iron consists of a toe piece mounted on a swivel plate with the toe piece engaging a spring and lever arrangement. The resistance of the spring is transmitted to the toe piece while the toe piece slides upon an edge of the spring and lever arrangement. The operation is such that during swivelling increases in resistance of the spring are compensated for by the elongation of the lever arm between the lever fulcrum and the bearing point of the toe piece.

---

The aim of the present invention is to create a safety ski-binding in which a retaining iron, engaging over the tip of the skiing boot, is flexibly arranged in such a way that it elastically absorbs the torsional forces occurring under normal skiing conditions, restores the skiing boot to its original position, after the forces have ceased to act and in the case of persisting or very strong torsional forces, which could result in the skier being injured, promptly releases the boot or the foot, the binding being constructed so as to function without an individually adjustable locking device, so that misadjustment by the skier is precluded.

Various types of safety ski-bindings are recognised, which absorb lateral shocks and release the boot when a predetermined turning moment, which is still just permissible for the skier's leg, is exceeded. These recognised safety ski-bindings have, however, the disadvantage that their toe irons make the swivelling movements for the absorption of lateral shocks about an axis lying vertically to the surface of the ski and arranged in front of the foot. In this case, it is inevitable that the member holding the sole, which is pivoted about this axis, will describe a circular path. At the same time, due to the edge of the member supporting the sole, which is at the rear relative to the direction of swivel, the boot is first pushed backwards in the longitudinal direction of the ski and, indeed, against the pull of the tightening device acting outwardly from the heel in the direction of the ski tip. If the edge of the supporting surface of the member holding the sole, which is at the rear relative to the direction of swivel, passes over the longitudinal centre line of the ski, the boot, following the member holding the sole, is steadily guided further forwards due to the effect of the force exercised by the tightening device. If one subsequently wishes to regain the normal position, this must be effected against the force of the tightening device and the friction existing between the boot sole and the surface of the ski. However, as a result, it not only becomes more difficult, but often even impossible to swivel back into the initial position, so that the foot is stuck in a central position, unless sufficient force is produced to release it. A further disadvantage of recognised swivelling irons, lies in the fact that a mechanism is required to adjust the strength of the return spring, so that it may be adapted to the weight of the skier concerned and the manner in which he skis.

A further substantial disadvantage of recognised bindings consists in that in recognised models, the movements have to take place directly against the force of the spring mechanism, which in this case opposes the movement with a steadily increasing force. The result of this is that recognised bindings having a restoring mechanism are comparatively unstable in the normal position, that is to say, they may be easily displaced to a slight extent, whilst a relatively large force is required to pass through the complete release cycle. If the retaining means were strengthened in the central position, the result would be that the releasability of the device would be jeopardised when torsional forces of too great a magnitude occurred.

In a further recognised safety toe iron, with automatic return to the central position, a locking element collaborates with an inclined restoring surface after being guided out of the locking groove, so that lateral force which occurs, will first be opposed with a uniform force, the boot being completely released only after a fairly short swivelling distance has been covered, during which the toe iron may be restored to its initial position by a cam guide on the locking device. In this case, the release of the boot is intended to occur promptly after reaching the point of release. Until the point of release which is attained after a relatively slight twisting angle, the swivelling movement is opposed with a relatively large force, which, due to an appropriately constructed restoring cam, decreases markedly after the point of release, so that a small force remains which is still able to effect the automatic return.

However, the desired compensating effect cannot be attained by employing the construction suggested. Since the swivelling retaining iron is rotatably supported by means of a pivot and the forward member gripping the tip of the boot makes a circular movement, the disadvantages which have already been described are present in this construction also. Thus in this case also, a return to the central position is generally impossible for the foot is stuck in a central position, which may lead to a fall. Since the size of the forces involved becomes greater and greater with the leverage produced as the swivelling angle increases, and no suitable compensating arrangement is present, the time-force curve on the graph will always exhibit a tendency to deviate considerably from a linear graph up to the point of release.

In the case of recognised toe irons, for the reasons which have already been mentioned, the return to the initial position will in any case create considerable difficulties, assuming that is, that it is not entirely impossible. Moreover, since the swivelling zone, within which the return is to take place as required, must be kept very small, it is essential for the locking device to be adjustable so as to prevent a premature release. The dangers which may result from inadequate adjustment of the binding are, however, not eliminated by these means.

The basic aim of the invention is to provide a toe iron for safety ski-bindings, which has a performance graph similar to that for recognised safety toe irons, in which it is, however, ensured that this performance curve may really be reproduced and in which also the further disadvantages of recognised constructions are avoided.

In accordance with the invention, in a toe iron for safety ski-bindings which can be moved against the action of a spring towards the release position and can be restored by the spring to the normal position until the release position is reached, this is attained in that it can be swivelled about a vertical axis lying in the area of the heel, out of its normal position, until it reaches a predetermined angular foot position without components of motion which are directed forwards in the longitudinal direction of the ski, and does not release the foot until this angular position has been overstepped, the power of the spring being transmitted through at least one lever and an abutting member of the toe iron which slides on a lever edge when swivelling occurs, the lever and the spring being constructed in such a way that when swivelling occurs, the increase in the resistance of the spring is approximately compensated for by the elongation of the lever arm between the lever fulcrum and the bearing point of the abutting member. At the same time, it is most essential for the toe iron to have no forwardly directed components of motion, since otherwise the forwardly acting force of the tightening device is completely neutralised and the releasing action is in no way influenced in the case of falls involving torsional forces nor the return, in the case of slight lateral shocks. In this way, it is possible to ensure an approximately uniform moment of resistance over a wide swivelling range, so that firstly, both too large a measure of instability in the central position and secondly, too great an increase in force up to the point of release is avoided and an individual setting for the strength of the spring may be dispensed with.

The spring element is now only subjected to stress by the turning moment produced at the skier's leg. This pre-supposes that a spring element can be provided which permits of a horizontal swing of any desired size, up to a maximum of half the width of the ski before the foot is then released, due to a swivelling of the supporting or inclined grip or a free pivoting of the base plate about an axis lying in the heel zone. The strength of the return mechanism spring is so calculated that the force with which the spring member opposes the swivelling movement is until the last of such magnitude only that it does not prove to be a source of danger even for the leg of a woman of slight weight and light bone structure. The explanation as to why a spring element of this type nonetheless also affords adequate support for the type of skiing practised as a sport by a heavy skier, is that the torsional forces usually occurring during a downhill run or even in the slalom are always intermittent and of short duration only. The proposed solution allows these shocks to be cushioned, whilst only a persisting and powerful turning moment is able to effect release.

The theoretical explanation of these safety ski-bindings, which require no adjustment and whose functioning involves relatively small forces but proportionately longer distances, is very simple and easy to understand. From the generally accepted formulae:

work $A$=force $P$×distance $S$
and energy $L$=work $A$/time $t$

It will be seen that the same "releasing work" may be done with a small force acting over a long distance as hitherto in recognised bindings with a large force acting over a short distance. At the same time, however, it will be seen that when a force is active for a short period, the energy which is taken up by the binding is of the same size in both types of binding. In previous models, a large force was produced both over a short distance and for a short time, whereas with the design in accordance with the invention, the large force cannot become effective, so that a greater distance results. The energy is the same in both cases. The most important thing is that the large force which is, of course, the sole and decisive cause of injury, cannot become effective.

The spring element must oppose the swivelling movement with an approximately uniform resistance over a maximum distance of approximately half the ski width. So that the counteracting resistance of the spring will always have approximately the same value and that the resultant line on the time-force graph will, therefore, really be straight, care must be taken in the construction of the return mechanism to ensure by appropriate measures that the resistance of the spring, which increases due to compression and extension, is neutralised. This may be achieved by varying the lever arms which take effect between the actual spring element and the swivelling toe iron. By designing the levers in the appropriate manner, besides an exactly uniform counterforce, practically any desired curve shape may also be obtained, for example a gently rising or falling curve. The curve may also for example, be so devised that it further tends to rise briefly at the end of the swivelling motion, immediately before the point of release so that a so-called centre of pressure is produced, which would represent an additional safeguard against the undesired release of the binding.

In the following description, the invention is explained in greater detail with reference to the drawings, in which are represented various forms of construction and performance graphs. In the drawings.

Figure 1:
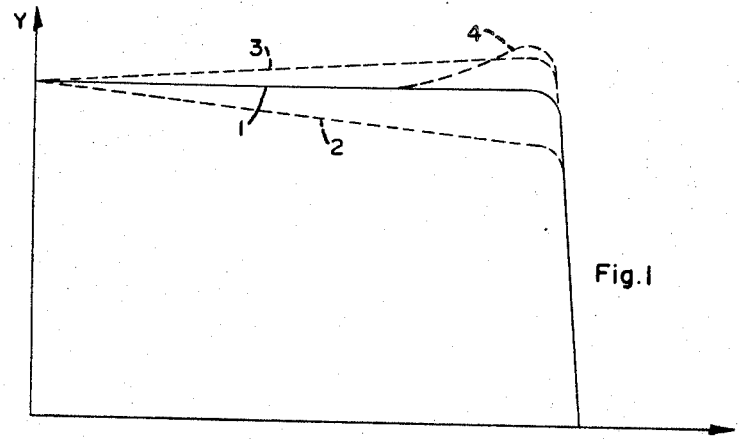
FIG. 1 shows a graph of the turning moment, which opposes the swivelling movement until the moment of release and which takes effect at the tip of the boot.

With the aid of a curve, FIG. 1 shows the turning moment with which the spring device opposes the swivelling movement of the foot. As curve 1 shows, the opposing turning moment is the same in every swivelling position, until the point at which the foot is released. It is essential for this turning moment to remain effective over a long distance. Then the turning moment, which acts upon the boot tip falls to zero, i.e., the foot may pivot quite freely. However, by using the means in accordance with the invention, which are yet to be explained in the following description, the opposing turning moment can at any time be given a falling (curve 2) or rising (curve 3) tendency also. It is likewise also possible to introduce a so-called centre of pressure (curve 4) which brings about a further brief rise in the turning moment, which would mean an additional precaution against undesired release.

Figure 2:
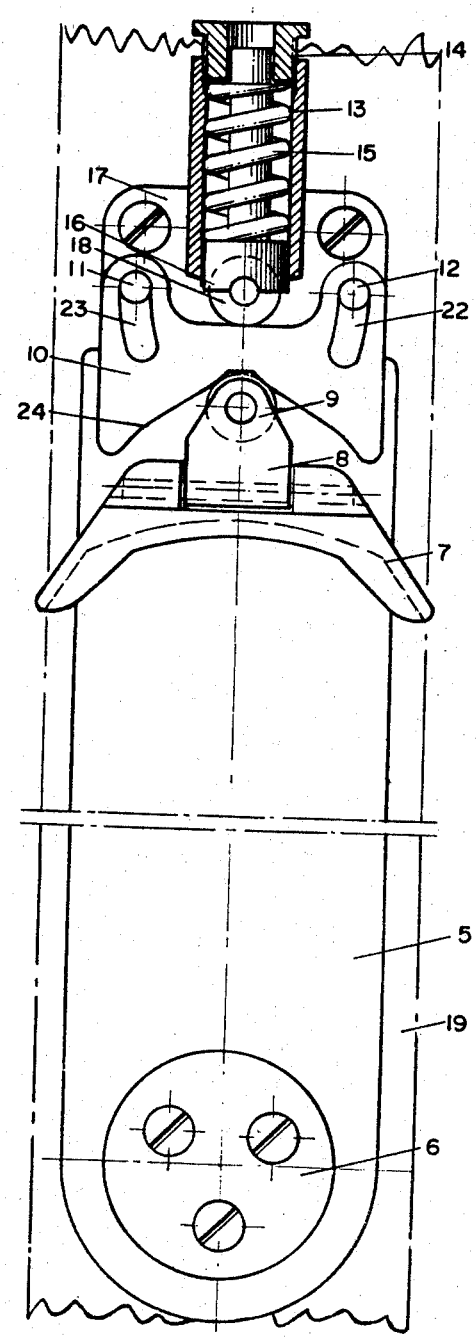
FIG. 2 shows a plan view of a first embodiment of a toe iron in accordance with the invention.
Figure 3:
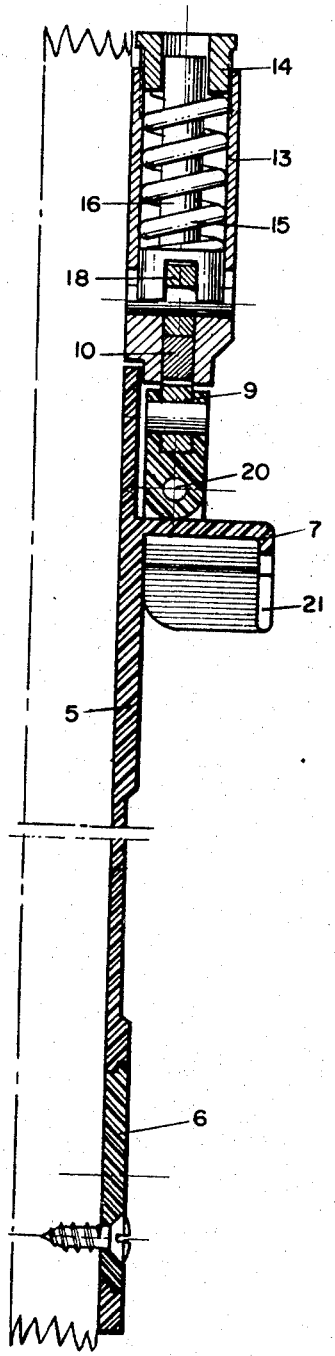
FIG. 3 shows a vertical section through the embodiment of FIG. 2.
Figure 4:
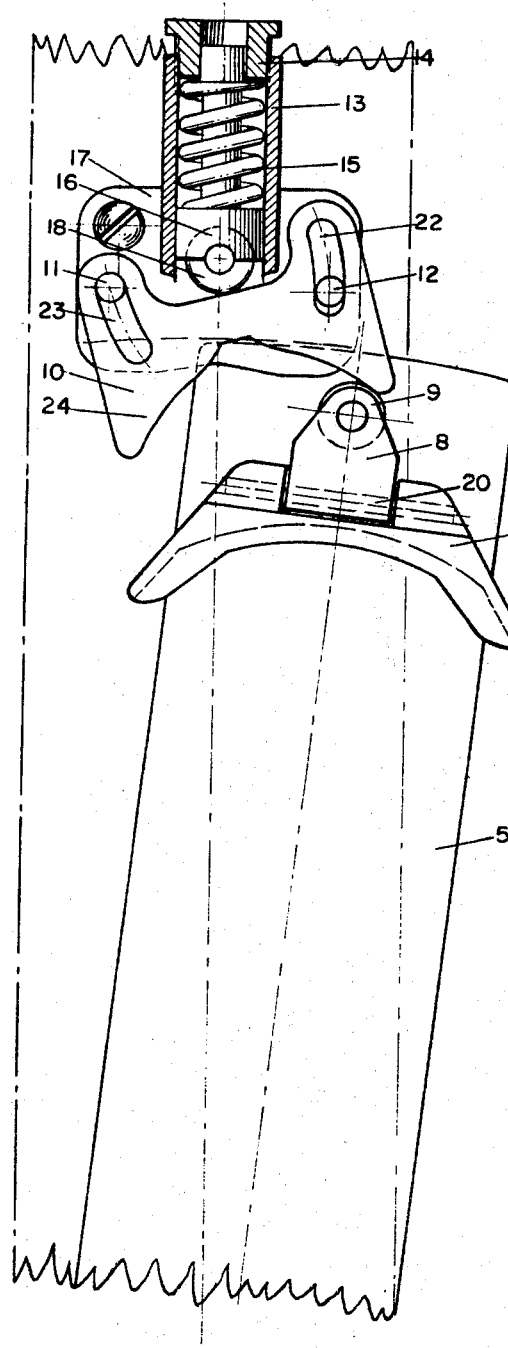
FIG. 4 shows a plan view of the embodiment of FIG. 2, with the toe iron swivelled outwards shortly before the foot is released.

FIGS. 2 to 4 show an embodiment of the present invention, in which a long base plate 5 is arranged to rotate about a round plate 6, which is securely mounted on the ski 19 and lies approximately in the area of the heel, the sole holder 7, whose retaining lip 21 fits over the forward edge of the sole from in front, being securely fastened to the base plate 5. Serving as the restoring mechanism is a cam plate 10 with a cam 24 which is held in its initial position by means of a spring 15 and the roller 18 is supported in the pivot bearing 16, the pivots 11, 12 being located in the end position of their associated guide slots 22, 23. If the base plate is now swivelled through a determined angle, cam plate 10 will rotate about one of the pins 11, 12 so that the second pin slides through the relevant guide channel 22, 23 to a corresponding extent, At the same time, the roller 9 rides upon cam 24. Due to the rotary motion of the cam plate 10, spring 15 is compressed so that the resistance of the spring acting on the cam plates 10 is increased. Since at the same time, however, the bearing point of roller 9 upon cam 24 is shifted outwardly, the increased resistance of the spring has no effect due both to the larger lever arm and the shifted line of application, i.e. it is neutralised.

Figure 5:
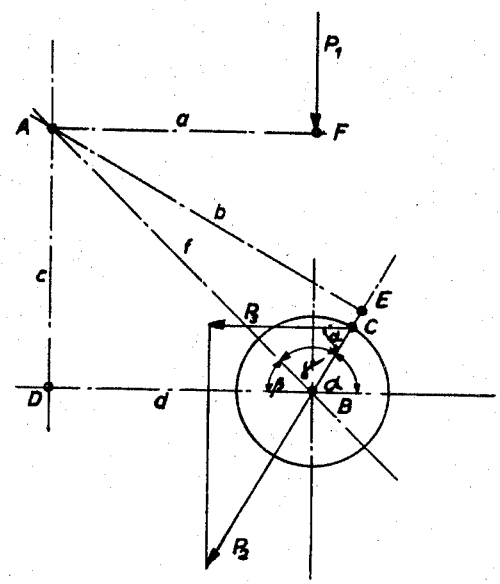
FIGS. 5 to 8 show graphs indicating how the points of the curve for the embodiment of FIGS. 2 to 4 are determined.
Figure 6:
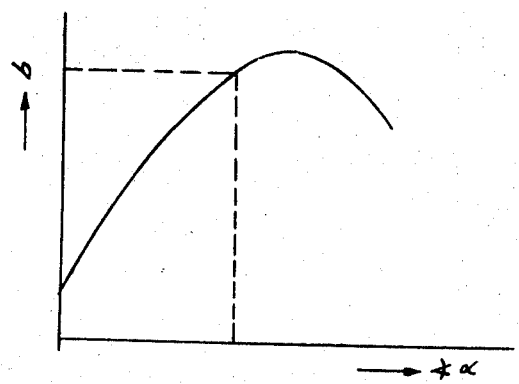

FIGS. 5 to 8 give examples of graphs showing how the cam 24 may be released so that in any swivelling position the base plate 5 opposes the swivelling motion with, for example, an equal tangential force. FIG. 5 shows the forces involved with their lines of application. The reasoning here is basically that the swivelling motion is counteracted by a force which is always constant, i.e. the force $P_3$ is constant. Associated with the force $P_3$ is a resultant force $P_2$ which through lever arm $AE=b$ must oppose a uniform turning moment to the spring resistance $P_1$, which acts through lever arm AF. However, since the lever arm $b$ and likewise the resultant force $P_2$ changes with variable angle $\alpha$, it is first necessary to plot curves which show the path of force $P_2$ relative to angle $\alpha$ (FIG. 7) as well as the curve for the length of lever arm $b$ relative to angle $\alpha$ (FIG. 6). Both may be calculated from the following formulae.

The distance $AD=c$ and $BD=d$ are basically governed by the construction and therefore known. For a determined swivelling movement of the base plate, involving a change in the position of point B, the new position may be readily determined from the existing swivelling radius and also the swivelling angle. The angle B may be calculated from distances $c$ and $d$ and thus also the distance $AB=f$ and, moreover, $$tg\ \beta=c/d;\ \cos\beta=d/f;\ f=d/\cos\beta$$

With angle $\beta$ and the distance $f$ the distance $AE=b$ may now however also be estimated and, indeed, for any angle $\alpha$.

$$\gamma=180°-(\alpha+\beta)$$
$$\sin\gamma=b/f;\ b=f\sin\gamma$$

The force $P_2$ may, moreover, also be calculated from the equation:

$$\cos=P_3/P_2;\ P_2=P_3/\cos\alpha$$

since $P_3$ will, of course, remain constant.

Figure 8:
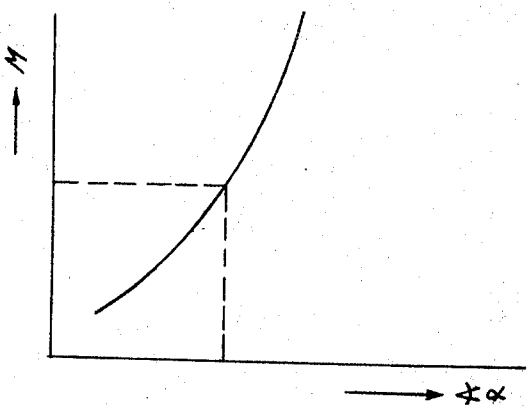

Now by multiplying each force $P_2$ associated with a determined angle by the relevant lever arm $b$ one obtains a FIG. 8 turning moment curve for each angle $\alpha$. In this curve representing the turning moment, we are dealing with the turning moments which would have to be applied by the spring force $P_1$ through lever arm $a$ for the relevant angle $\alpha$, so that a constantly uniform tangential force is maintained.

Figure 7:
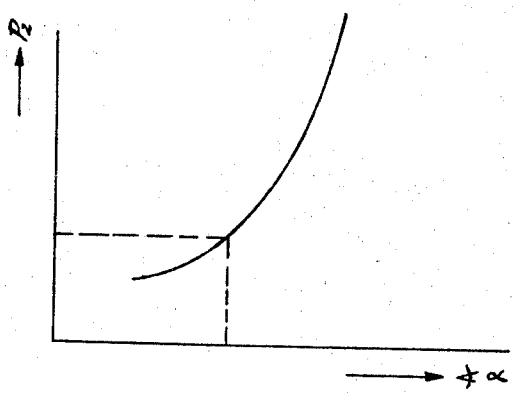

Given a quite specific turning moment, the corresponding angle $\alpha$ can be determined from the turning moment curve in FIG. 8 and thus the associated value $P_2$ and $b$ from the curves in FIGS. 6 and 7. In this way, the point of contact at the circle is established. By swivelling back from the relevant swivelling position into the initial position one obtains the curve which ensures a uniform tangential force $P_3$ for a determined given turning moment.

In the embodiment of FIGS. 2 to 4, the base plate 5 can swivel freely about point 6 after release from the restoring mechanism. So that the base plate 5 may be easily reintroduced into the restoring mechanism which snaps back into the initial position, the member 8, in which roller 9 is supported, may be swivelled vertically about an axis 20 lying at right angles to the ski.

Figure 9:
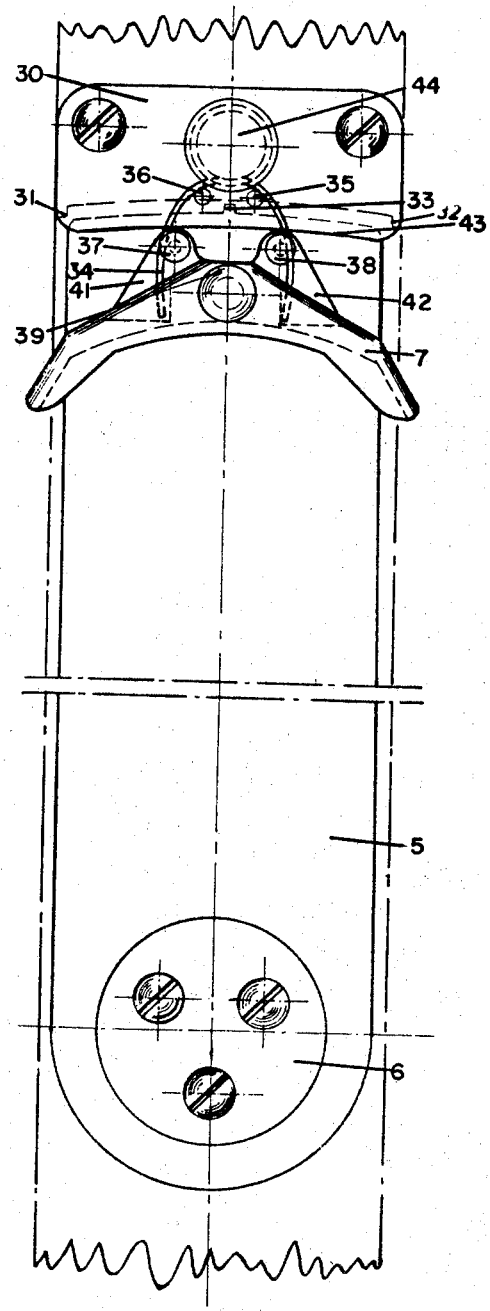
FIG. 9 shows a plan view of a second embodiment of a toe iron in accordance with the invention.
Figure 10:
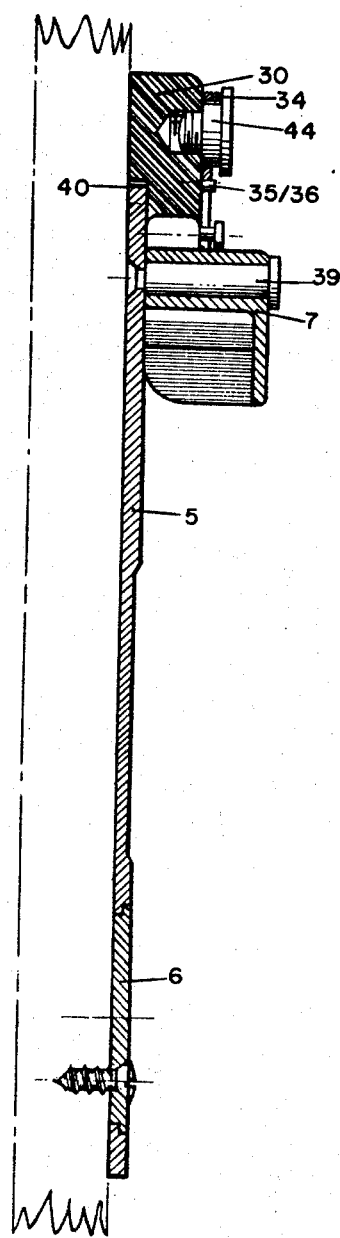
FIG. 10 shows the embodiment of FIG. 9 in vertical section.
Figure 11:
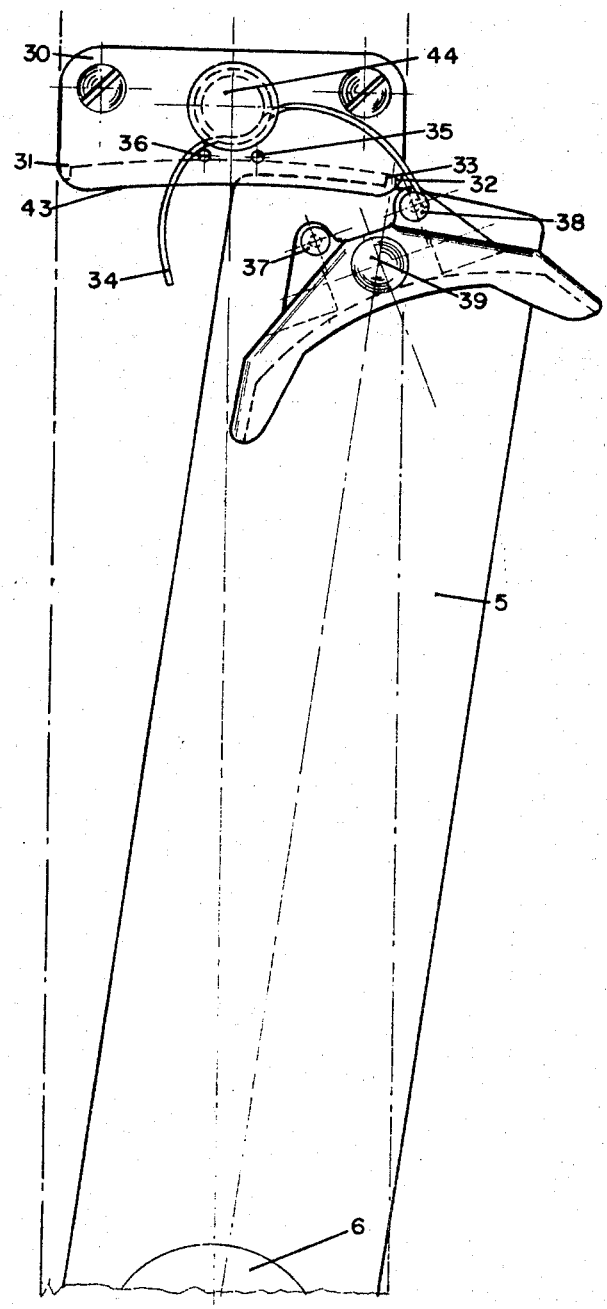
FIG. 11 shows a plan view of the embodiment of FIG. 9 in the release position.
Figure 12:
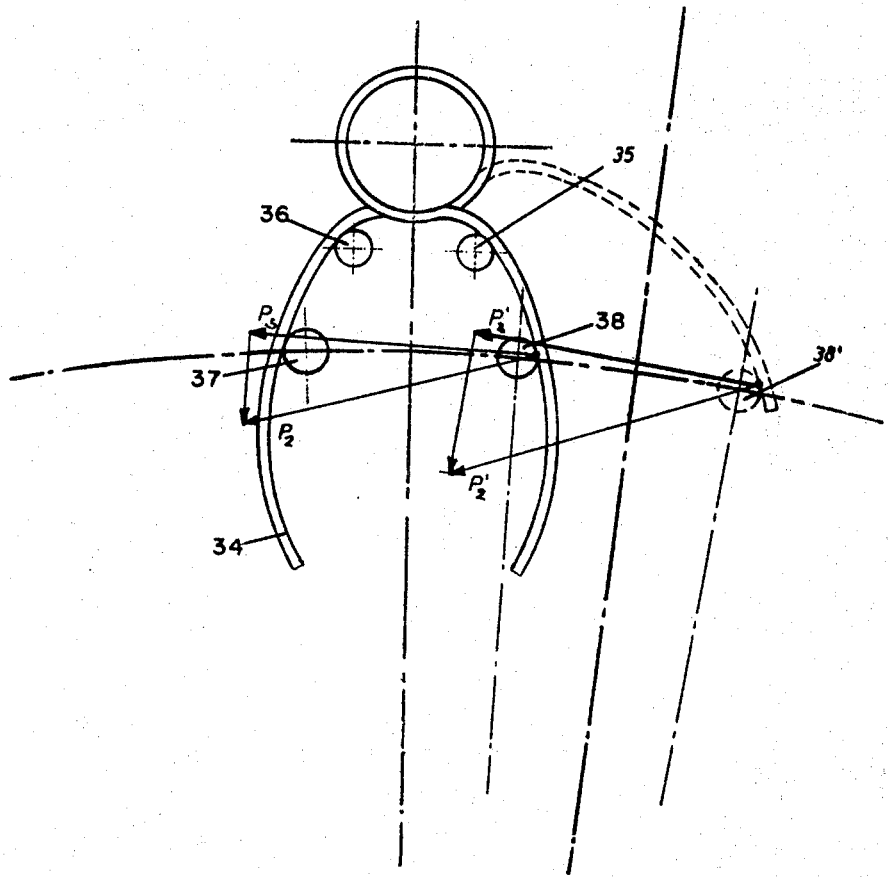
FIG. 12 shows a triangle of forces at the spring element of the embodiment of FIGS. 9 to 11 in the central and end positions.

FIGS. 9 to 11 show another embodiment of the invention. Here, too, a long base plate 5 swivels about a point 6, which, for example, lies on a par with the axis of the ankle. In this case, the sole holder 7 is arranged on plate 5 so that it can swivel about the axis 39 and is supported through the guide members 41 by cam 43 of member 30 which is securely mounted on the ski, so that the sole holder 7 is prevented from pivoting horizontally outwards before the release position. In this case, the return element is constructed as a torsion spring which is guided by pin 44 and is held in its initial stressed position by the stops 35, 36. When the base plate 5 swivels outwardly, a stop 37, 38 is in each case guided against one of the two ends of the spring so that the spring is subjected to greater tension. By varying the lever arm or by giving the ends of the spring a suitable shape, the increasing resistance of the spring is again neutralised. By way of example, FIG. 12 shows the triangle of forces for the initial position and the end swivelling position. It is absolutely essential that the force $P_2$ should act on each swivelling point in such a way that the uniform tangential force desired $P_3$ is maintained. The force $P_2$ or $P'_2$ which thus results must be equal to the relevant resistance of the spring dependent on the spring characteristic.

The base plate 5 is guided in a recess 40 of the fixed member 30, so that in the end swivelling position the stop 33 of the base plate 5 comes to rest against a stop 31, 32 of the fixed member 30 in each case with the result that the base plate 5 cannot swivel freely outwards. On the other hand, however, in the end swivelling position, one of the guide members 41, 42 is in each case released from the guide cam 43 so that the sole holder may now swivel forwards about the axis 39. FIG. 11 shows the corresponding position. As was previously the case, however, the restoring element still remains engaged so that the base plate 5 with the sole holder 7 is also automatically guided back into the initial position after the foot is released.

Figure 13:
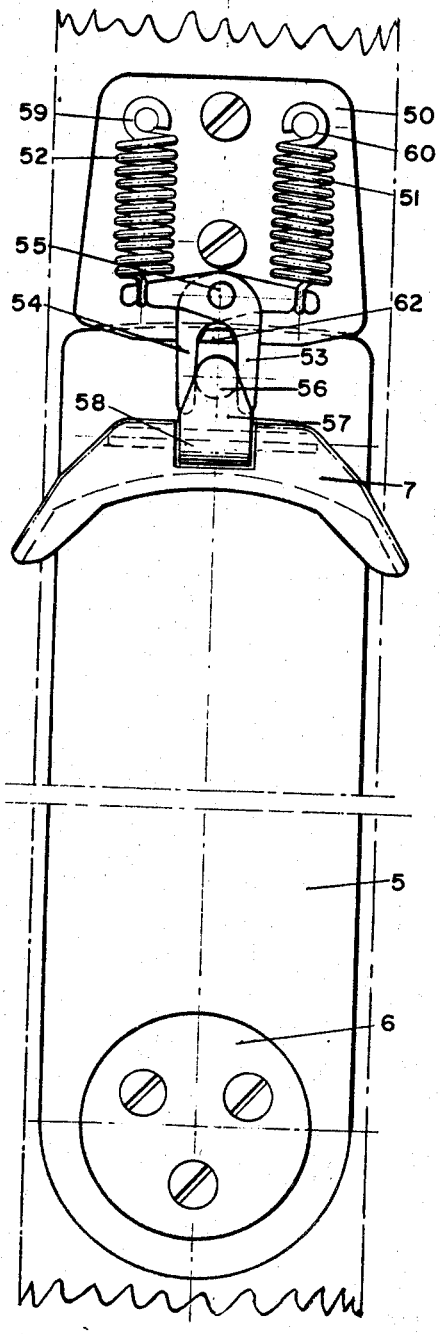
FIG. 13 shows a plan view of a third embodiment of a toe iron in accordance with the invention.
Figure 14:
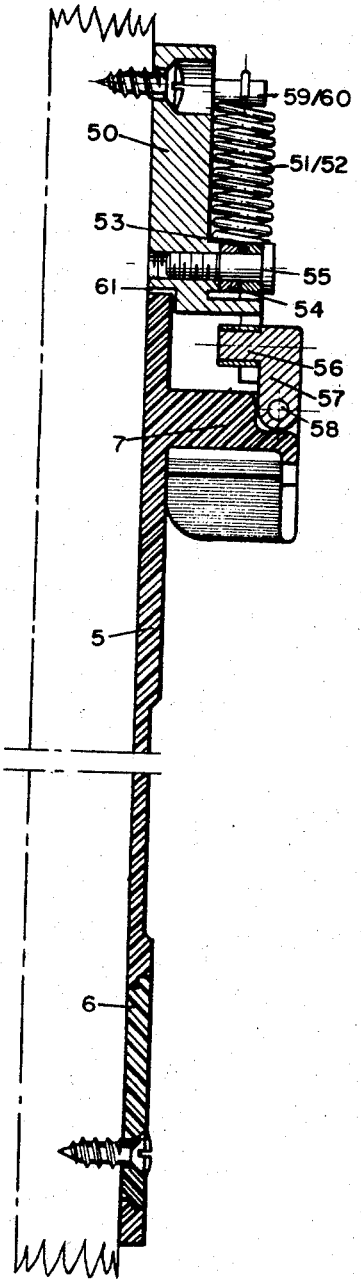
FIG. 14 shows a vertical section of the embodiment of FIG. 13.

FIGS. 13 and 14 show a further embodiment of a toe iron in accordance with the invention. Here too, as in the embodiment according to FIGS. 2 to 4, a long base plate 5 is employed which is arranged to pivot about a point 6, the sole holder 7 being in this case also rigidly supported on the base plate 5. The base plate 5 is guided in a recess 61 of the member 50 which is rigidly mounted on the ski. Serving in this case as the return element, are two springs 51, 52 which act on the pivot 56 through bellcrank levers 53, 54 which are arranged to pivot about a common axis 55, and thus hold the base plate in the central position. When the base plate 5 is swivelled outwardly, the pivot 56 is guided against one of the bellcrank levers 53, 54 so that the latter makes a rocking movement thus subjecting the spring to additional tension. However, the increasing resistance of the spring is again neutralised by extending the lever arm and by suitably shifting the point of impact of the force upon the pivot 56, so that here too, the swivelling motion is again opposed by a force which, for example, is equal in every swivelling position. In this case, after release in the end swivelling position the base plate may once more swivel freely about the point 6. In order to achieve a smooth return to the initial position after release, the pivot 56 may be vertically swivelled by means of member 57 against an axis 58 lying at right angles to the ski. In order to prevent the relevant lever which is free of the load from pivoting outwardly during the swivelling process and at the same time to enable pivot 56 to be inserted between levers 53, 54 a stop 62 is arranged between the levers.

I claim:

1. Toe iron for safety ski bindings which can be swivelled out of its normal position about a vertical axis lying in the area of the heel without forwardly directed components of motion in the longitudinal direction of the ski until it reaches a predetermined angular release position comprising a toe piece to be mounted on a ski for pivotal motion about said vertical axis lying in the area of the position of the heel of the ski boot which engages the toe piece and lever means including a spring engaging the toe piece such that the resistance of the spring is transmitted to the toe piece while said toe piece slides upon an edge of said lever means during swivelling thereof, said lever means being so constructed that when the swivelling occurs the increase in the resistance of the spring is approximately compensated for by the elongation of the lever arm between the lever fulcrum and the bearing point of the toe piece.

2. Toe iron in accordance with claim 1, wherein the toe piece is arranged on an elongated swivelling plate, which is supported on the ski so as to be rotatable about said axis arranged in the area of the heel.

3. Toe iron in accordance with claim 2, wherein the toe piece is pivotably supported on the swivelling plate and is locked so that it cannot swivel until it reaches the predetermined angular position.

4. Toe iron in accordance with claim 2, wherein the toe piece is supported non-rotatably on the swivelling plate and that the swivelling plate is released after the predetermined angle has been exceeded.

5. Toe iron in accordance with claim 1, wherein the lever means includes a cam plate pivotably disposed about two points, the cam plate being subject to the action of the spring and defining guide slots with a pin received in each slot.

6. Toe iron in accordance with claim 1, wherein the lever means comprises torsion springs, whose elongated free ends collaborate in each case with the toe piece on the one hand, and a fixed stop on the ski on the other.

7. Toe iron in accordance with claim 1, wherein the lever means includes bell-cranks pivotable about a common fulcrum, and which collaborate with the spring, the free lever arms lying around the bearing upon the toe piece.

8. Toe iron in accordance with claim 7, wherein the toe piece includes an abutting member bearing against the lever means and vertically pivotable about an axis lying at right angles to the ski to guide the toe piece into the central position.

References Cited

UNITED STATES PATENTS

| 3,037,785 | 6/1962 | De Place | 280—11.35 |
| 3,201,140 | 8/1965 | Marker | 280—11.35 |

FOREIGN PATENTS

| 1,126,948 | 8/1956 | France. |
| 1,326,431 | 4/1963 | France. |
| 1,372,663 | 8/1964 | France. |

LEO FRIAGLIA, *Primary Examiner.*

MILTON L. SMITH, *Assistant Examiner.*